(12) United States Patent  (10) Patent No.: US 7,752,438 B2
Foster et al.  (45) Date of Patent: Jul. 6, 2010

(54) SECURE RESOURCE ACCESS

(75) Inventors: Ward Scott Foster, Boise, ID (US);
Robert John Madril, Jr., Boise, ID (US); Shell Sterling Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1812 days.

(21) Appl. No.: 10/229,642

(22) Filed: Aug. 27, 2002

(65) Prior Publication Data

US 2004/0054916 A1   Mar. 18, 2004

(51) Int. Cl.
*H04L 29/06* (2006.01)
*G06F 21/00* (2006.01)
(52) U.S. Cl. .......................................... 713/167; 726/4
(58) Field of Classification Search ................. 713/167; 726/4
See application file for complete search history.

(56) References Cited

U.S. PATENT DOCUMENTS

| | | | |
|---|---|---|---|
| 5,818,936 A * | 10/1998 | Mashayekhi ................ 713/167 |
| 6,138,238 A * | 10/2000 | Scheifler et al. ............. 709/229 |
| 6,192,476 B1 * | 2/2001 | Gong ............................. 726/4 |
| 6,226,752 B1 * | 5/2001 | Gupta et al. .................... 726/9 |
| 6,425,011 B1 * | 7/2002 | Otani et al. .................. 709/229 |
| 6,460,141 B1 * | 10/2002 | Olden ............................ 726/4 |
| 6,807,636 B2 * | 10/2004 | Hartman et al. ............. 713/167 |
| 2002/0049912 A1 * | 4/2002 | Honjo et al. ................... 726/10 |
| 2002/0112155 A1 * | 8/2002 | Martherus et al. ........... 713/155 |
| 2003/0065792 A1 * | 4/2003 | Clark ........................ 709/229 |

* cited by examiner

*Primary Examiner*—Gilberto Barron, Jr.
(74) *Attorney, Agent, or Firm*—Jack H. McKinney

(57) ABSTRACT

Authorizing access to a network resource utilizing an autonomous authorization service. One method embodying the invention includes receiving a request to access a resource and acquiring credentials, identifying an authorization service that is autonomous of the resource, providing the credentials to the authorization service and requesting authorization to access the resource. The authorization service authenticates the credentials and authorizes access the resource only if the credentials are authentic.

16 Claims, 5 Drawing Sheets

FIG. 3

ACCESS DATABASE — 34, 46

| USER | AUTHORIZATION |
|---|---|
| user(1) | www.authority(1).com |
| user(2) | www.authority(2).com |
| ... | ... |
| user(n) | www.authority(n).com |

AUTHORIZATION DATABASE — 40, 54

| RESOURCE | CREDENTIALS | APPLICATION | POLICY |
|---|---|---|---|
| www.resource(1).com | user(1)/pass(1) | www.application(1).com | policy(1) |
| www.resource(2).com | user(2)/pass(2) | www.application(2).com | policy(2) |
| ... | ... | ... | ... |
| www.resource(n).com | user(n)/pass(n) | www.application(n).com | policy(n) |

50, 52, 56, 48

SECURE RESOURCE ACCESS

FIELD OF THE INVENTION

The present invention is directed to accessing a distributed resource. More particularly, the invention is directed to authorizing access to a distributed resource utilizing an autonomous, de-centralized authorization service.

BACKGROUND OF THE INVENTION

In a basic desktop computing environment, a computer, accessing data from its hard drive, performs a specified function such as word processing, displaying information on a screen, and, when requested, producing a document on a connected printer. In a distributed computing environment, the resources found in the desktop environment are spread across any number of interconnected devices. For example, a client accesses a resource over the Internet. Accessing data provided by the client or located and retrieved from another device, the resource performs specified tasks. These tasks include, among a multitude of others, manipulating the data as instructed, returning the data for use by the client, and/or sending the data to a printer for production.

The following provides a more specific example of a distributed computing system utilized to print documents. A client computer, utilizing a web browser and the Internet, accesses a web server providing a document printing resource. The web server may be running on a device connected to or networked with one or more printers. Alternatively, the web server may be embedded in the printer itself. The printing resource locates available printers and a data resource managing electronic documents. The printing service then returns to the browser a graphical interface containing user accessible controls for selecting a document from the data resource as well as controls for selecting a printer. Selections made through the interface are returned to the printing resource. Accessing the data resource, the printing resource retrieves and/or sends the selected document to the selected printer for production.

Accessing distributed resources raises a number of security considerations. Access to a resource may be limited for commercial or privacy purposes. Using the example above, a user may be a paid subscriber enabling access to the printing resource. The user may pay a flat rate or may pay for each use. For commercial security, the user may be required to present credentials such as a user name and password in order to access the printing resource. The same may be true for the data resource. However, presenting credentials to the data resource also promotes user privacy. A user may store documents on the data resource that the user desires to keep private and secure.

In the example above, a user is required to present one set of credentials to access the printing resource and a second set of credentials to access the data resource. It is often difficult for a user to keep track of more than one set of credentials. The printing and data resources are each responsible for and include programming for authenticating the credentials presented to authorize use. While this authorization programming may not be located on the same computing device as the particular resource, it is still centralized, effectively operating and located on the same site. This centralized approach to authorization can lead to network communication "bottlenecks" and decreased performance. Additionally, the centralized approach creates security risks providing a single point of attack for an unscrupulous third party.

SUMMARY

Accordingly, the present invention is directed to authorizing access to a network resource utilizing an autonomous authorization service. One method embodying the invention includes receiving a request to access a resource and acquiring credentials, identifying an authorization service that is autonomous of the resource, providing the credentials to the authorization service and requesting authorization to access the resource. The authorization service authenticates the credentials and authorizes access the resource only if the credentials are authentic.

DESCRIPTION OF THE DRAWINGS

FIG. 3 is a table illustrating the logical elements of an access database according to an embodiment of the present invention.

FIG. 4 is a table illustrating the logical elements of an authorization database according to an embodiment of the present invention

DETAILED DESCRIPTION

Figure 1:
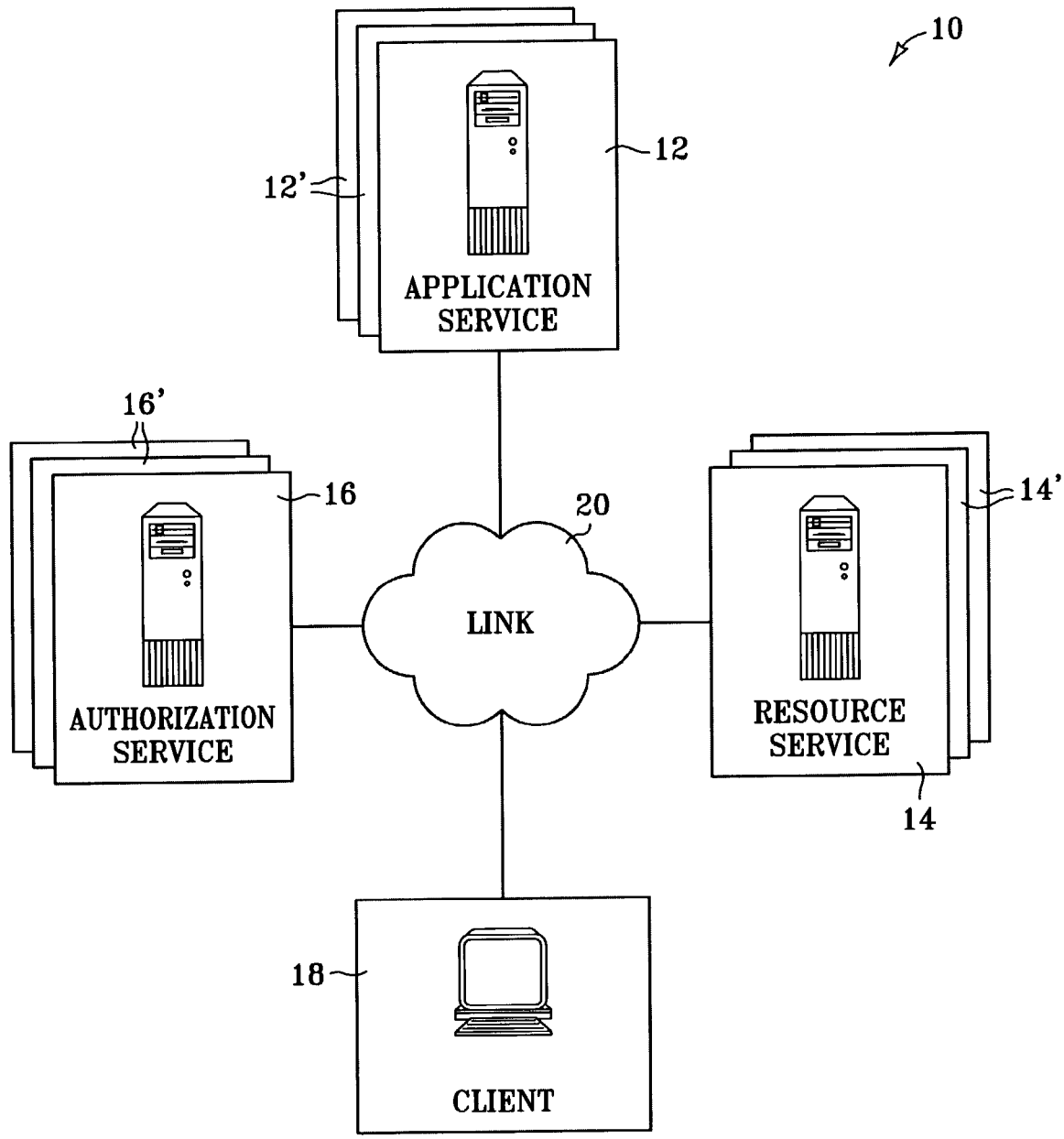
FIG. 1 is a schematic representation of a computer network in which various embodiments of the present invention may be incorporated.

Glossary:

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Client-Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for acting on the client request and returning requested information, if any, back to the client. This requested information may be an electronic file such as a word processing document or spread sheet, a web page, or any other electronic data to be displayed or used by the client. In any given network there may be multiple clients and multiple servers. A single device may contain programming allowing it to operate both as a client device and as a server device. Moreover, a client and a server may both operate on the same device.

Web Server: A server that implements HTTP (Hypertext Transport Protocol). A web server can host a web site or a web service. A web site provides a user interface by supplying web pages to a requesting client, in this case a web browser. Web pages can be delivered in a number of formats including, but not limited to, HTML (Hyper-Text Markup Language) and XML (eXtensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface which may be exposed using a variety of protocols layered on top of HTTP, such as SOAP (Simple Object Access Protocol).

Interface: The junction between a user and a computer program providing commands or menus through which a user communicates with the program. The term user represents generally any individual, mechanism, or other programming desiring to communicate with the program. For example, in the client-server model defined above, the server usually generates and delivers to a client an interface for communicating with a program operating on or controlled by the server device. Where the server is a web server, the interface is a web page. The web page, when displayed by the client device, presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands. Where the user is other programming, an interface may be a programmatic interface enabling the user (programming) to interact with the computer program.

Introduction: In distributed computing environments, a user employs a client to request access to one or more network resources. The request includes the user's credentials which are required to be verified before access to the resources is granted. It is expected that various embodiments of the present invention will provide a decentralized and autonomous system or systems for authorizing requests to access the network resource.

Although the various embodiments of the invention disclosed herein will be described with reference to the computer network 10 shown schematically in FIG. 1, the invention is not limited to use with network 10. The invention may be implemented in or used with any computer system in which it is necessary or desirable to access electronic data. The following description and the drawings illustrate only a few exemplary embodiments of the invention. Other embodiments, forms, and details may be made without departing from the spirit and scope of the invention, which is expressed in the claims that follow this description.

Referring to FIG. 1, computer network 10 represents generally any local or wide area network in which a variety of different electronic devices are linked. Network 10 includes application service 12, resource service 14, authorization service 16, and client 18 all interconnected by link 20. Application service 12 represents generally any combination of programming and/or hardware capable of distributing an application over network 10. Resource service 14 represents any combination of hardware and/or programming capable of providing a resource to a distributed application. Authorization service 16 represents generally any combination of hardware and/or programming capable of authorizing a request to access application service 12 and/or resource service 14. Client 18 represents any combination of hardware and/or programming capable of interacting with application service 12, resource service 14, and authorization service 16. Network 10 may also include one or more additional application services 12', resource services 14', and authorization services 16'.

Link 20 interconnects devices 12-18 and represents generally a cable, wireless, or remote connection via a telecommunication link, an infrared link, a radio frequency link, or any other connector or system that provides electronic communication between devices 12-18. Link 20 may represent an intranet, an Internet, or a combination of both. Devices 12-18 can be connected to network 10 at any point and the appropriate communication path established logically between devices 12-18.

Components: The logical components of one embodiment of the invented resource access system will now be described with reference to the block diagram of FIG. 2. Application service 12 includes application 22, application server 24, and resource module 26. Application 22 represents generally any programming capable of being distributed over network 10. For example, application 22 may be a document production service or a remote document management service. Application server 24 represents generally any programming capable of distributing application 22. Application server 24 is also capable of generating or otherwise providing an interface to be displayed by client 18 enabling a user to interact with application 22. Resource module 26 represents generally any programming capable of identifying and interacting with resource service 14.

Resource service 14 includes resource 28, resource server 30, access module 32, and access database 34. Resource 28 represents generally any programming capable of being accessed and utilized over network 10. For example, where application 22 is a document production service, resource 28 may be a remote document management service. Resource server 30 represents any programming capable of making resource 28 available over network 10. Access module 32 represents any programming capable of communicating with authorization service 16 and limiting access to resource 28. Access database 34 represents any logical memory to contain data used by access module 32.

Authorization service 16 includes authorization module 36, authorization server 38, and authorization database 40. Authorization module 36 represents generally any programming capable of communicating with resource service 14 in order to authorize a request to access resource 28. More specifically, authorization module 36 is responsible for receiving and acting upon a call from access module 32 to authorize a request from application service 12 and/or client 18 to access resource 28. Authorization server 38 represents generally any programming capable of making resource 28 available over network 10. Authorization database 40 represents generally any logical memory to contain data used by authorization module 36.

In this example, servers, 24, 30, and 38 are web servers. Consequently, client 18 includes browser 41. Browser 41 may be a commercially available web browser such as Microsoft's Internet Explorer. The browser may be an integral component of another program such as a word processor that enables the program to interact with servers 24, 30, and 38.

Referring now to FIG. 3, access database 34 includes a number of entries 42. Each entry contains a user field 44 and an authorization service field 46. Each user field 44 contains data uniquely identifying a particular user. Each authorization service field 46 contains data uniquely identifying a particular authorization service that may or may not be authorization service 16. In this example, the data is in the form of URLs (Uniform Resource Locators). However, the data may take any form that enables access database 34 to locate a particular authorization service 16.

Referring now to FIG. 4, authorization database 40 includes a number of entries 48. Each entry includes a resource field 50, credentials field 52, application field 54, and policy field 56. Resource fields 50 contain data identifying a particular resource service that may or may not be resource service 14. Each credentials field 52 contains verified credentials for accessing the resource identified in resource field 50 of a particular entry 48. Application fields 54 contain data identifying application services, one of which may or may not be application service 12. A given application field 54 may contain data identifying more than one application service 12. Each policy field 56 contains data used to limit the access application service 12 identified in application field 54 has to the resource service 14 identified in the resource field 50 for a particular entry 48. For example, where an identified application service 12 is a printing service and an identified resource service 14 is a document management service, data in policy field 56 may restrict the printing service from accessing certain types of documents managed by the document management service.

Figure 2:
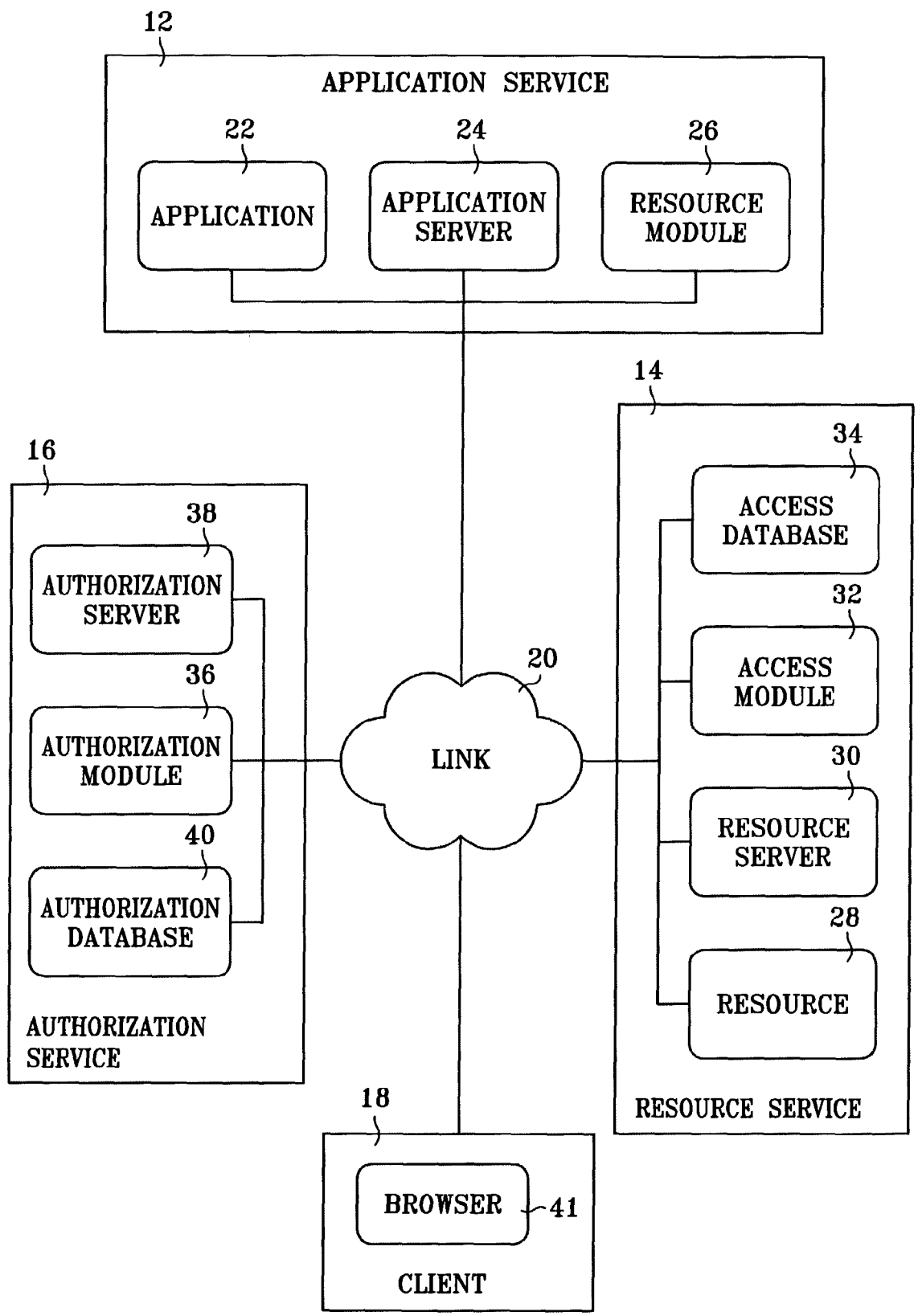
FIG. 2 is a block diagram of the network of FIG. 1 illustrating the logical program components operating on each device according to an embodiment of the present invention.

The block diagram of FIG. 2 and the tables of FIGS. 3 and 4 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programs and data for use by or in connection with the instruction execution system. Specific examples of a suitable computer-readable medium include, but are not limited to, a portable magnetic computer diskette such as a floppy diskette or hard drive, a random access memory (RAM), a read-only memory (ROM), an erasable programmable read-only memory, or a portable compact disc.

Figure 5:
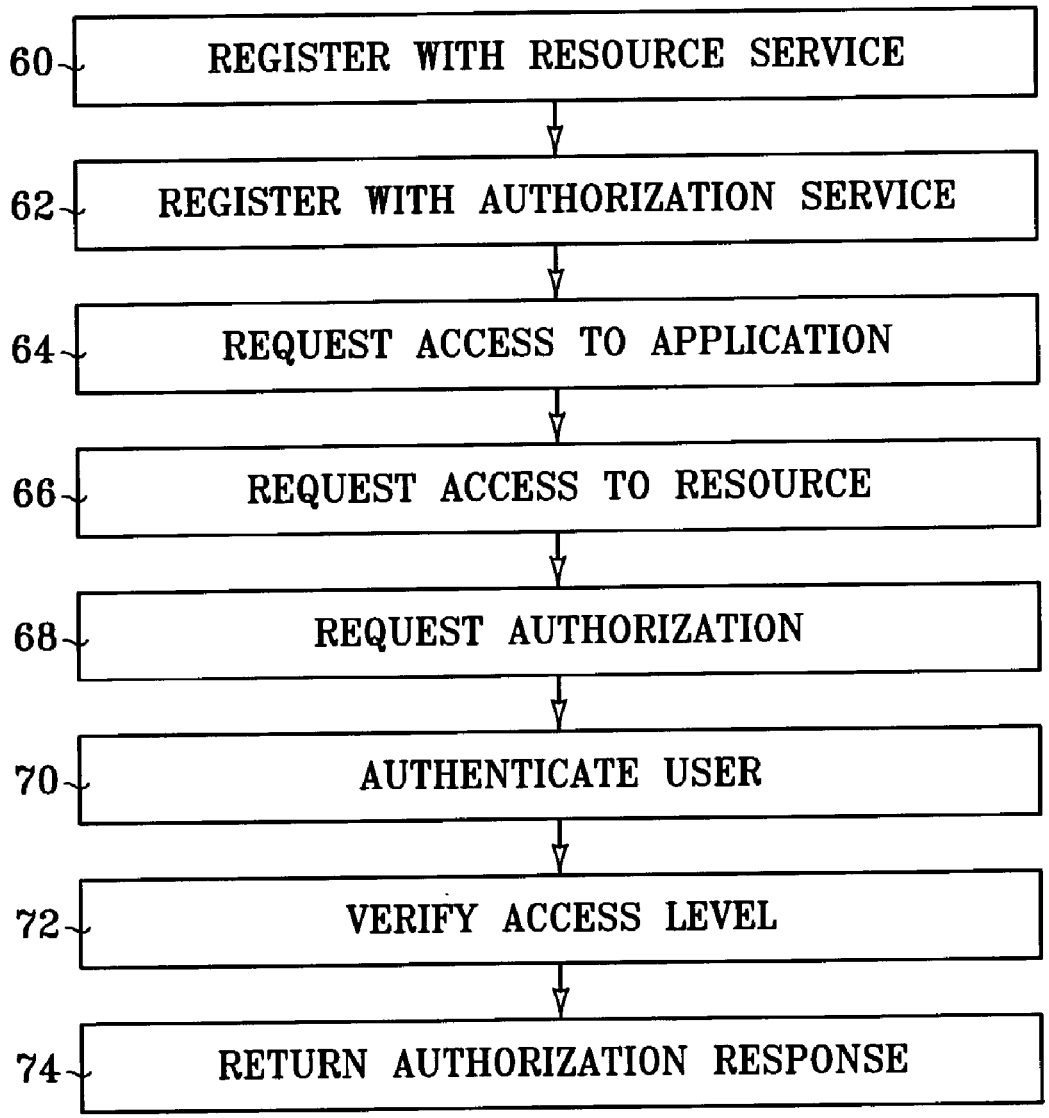
FIG. 5 is a flow diagram illustrating the steps of a secure resource access method according to an embodiment of the present invention.

Operation: The operation of a resource access method according to one embodiment of the invention will now be described with reference to the flow diagram of FIG. 5. FIG. 5 illustrates an example of steps taken to grant a request to access resource 28. In this example, servers 24, 30, and 38 are web servers.

Initially, a user registers with resource service 14 (step 60). This involves providing resource service 14 with data identifying authorization service 16. The user may also provide or resource service 14 may generate data uniquely identifying the user. Access module 32 then creates a new entry 42 in access database 34 containing the data provided and/or generated. The user also registers with authorization service 16 (step 62). This involves providing authorization service 16 with data identifying resource service 14 and application service 12. The user may provide policy data for limiting the level of access that application service 12 will have to resource service 14. With or without input from the user, authorization service 16 generates credentials uniquely identifying the user. Using the provided and generated data, authorization module 36 then creates a new entry 48 in authorization database 40.

Through browser 41, the user requests access to application service 12 (step 64). Typically, this involves browsing to a network address established for application 22. Data identifying resource service 14 and credentials for accessing resource 28 are provided with this request or at a later time. Credentials may be provided in the form of a cookie. A cookie is a message given to a browser by a web server. The browser stores the message in a text file. The message, in many cases, is a simple alphanumeric data string unique to the given browser. The message is then sent back to the server each time the browser sends a request to the web server. In this case the cookie's message would represent the user's credentials. Where a cookie is not present, credentials such as a user name and password can be provided manually through a web page.

Application server 24 receives the request from browser 41 and forwards the request to application 22. At the direction of application 22 and using the data provided following step 64, resource module 26 requests access to resource service 14 (step 66). Resource module 26 includes with the request the credentials and data identifying application 22. Resource server 30 receives and forwards the request to access module 32.

Access module 32 locates an entry 42 in access data base 34 having a user field 44 containing data identifying the user who requested access to application service 12 in step 64. From resource field 50 of the located entry 42, access module 32 acquires data identifying authorization service 16. Access module 32 then sends a request to the identified authorization service—in this case authorization service 16—to authorize the request from application service 12 (step 68). Access module 32 includes with the request the credentials, data identifying application service 12, and data identifying resource service 14.

Authorization server 38 receives and forwards the request to authorization module 36. Using the data provided with the request, authorization module 36 authenticates the credentials (step 70). To do so, authorization module 36 identifies an entry 48 in authorization database 40 that contains a verified copy of the credentials as well as data identifying resource service 14. If such an entry 48 is found, the credentials are authentic. Authorization module 36 then verifies the level of access to resource 28 to be granted to application 22 (step 72). To do so, authorization module 36 acquires from the identified entry 48 policy data for application service 12.

Authorization module 36 then returns a response to access module 32 (step 74). If the credentials are not authentic, the response instructs access module 32 to deny the request from application service 12. If the credentials are authentic, the response instructs access module 32 to grant the request from application service 12 along with data indicating the level of access to be granted.

Figure 6:
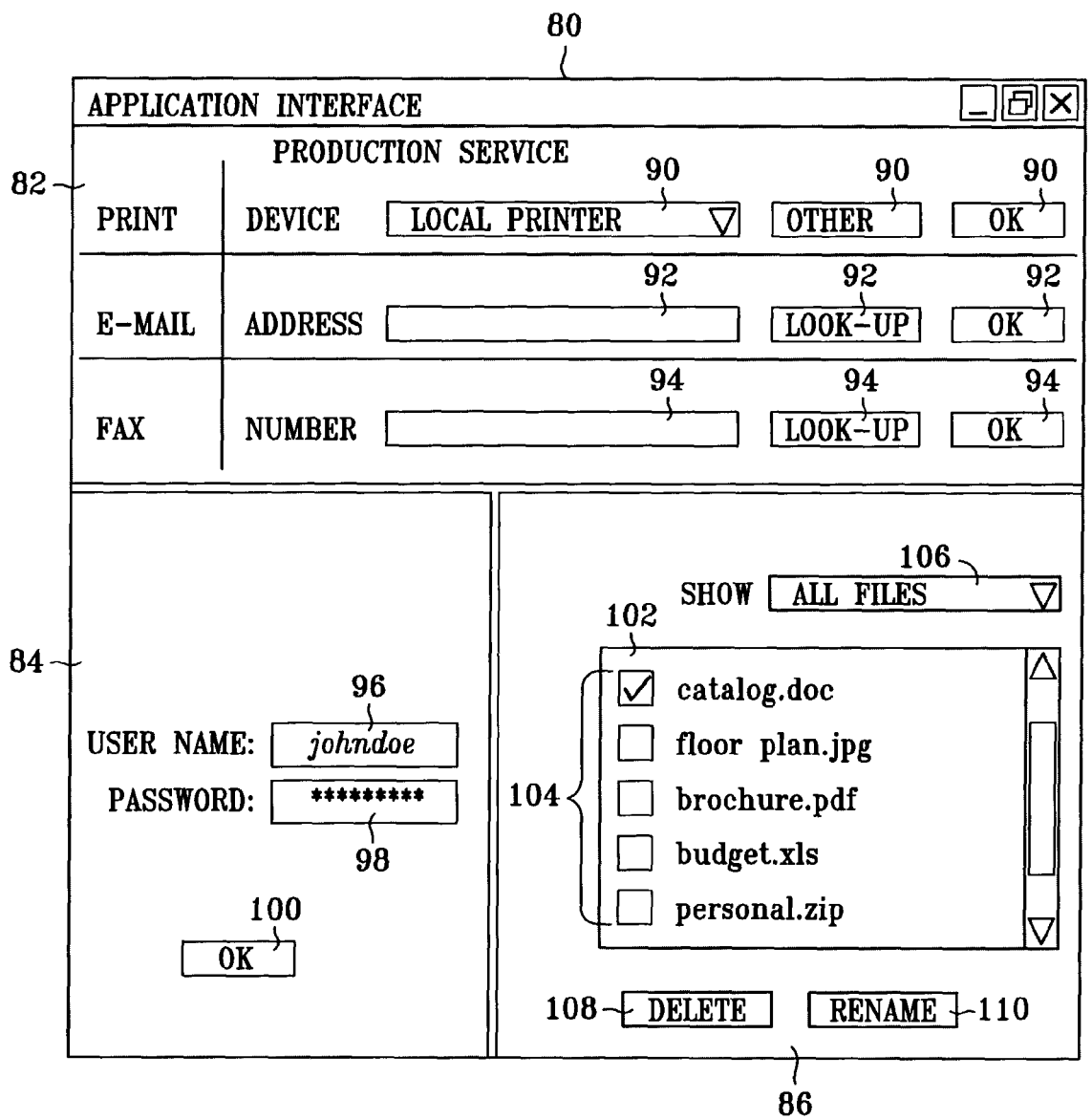
FIG. 6 is an exemplary screen view of a common interface enabling a user to interact with a document production service, a document management service, and an authorization service according to an embodiment of the present invention.

FIG. 6 is an exemplary screen view of an interface, in this case a framed web page 80, designed to enable a user to interact, at least indirectly, with application 22, resource 28, and authorization module 36. A framed web page is one that divides the browser's display area into two or more sections or frames. The actual content of each frame is not provided by the framed web page itself. Rather, the framed web page provides, for each frame, a network address for accessing content to be displayed in that frame.

In this example, application 22 is a network resource providing document production services while resource 28 is a network resource providing remote document management.

Web page 80 includes first frame 82, second frame 84, and third frame 86. First frame 82 contains controls for interacting with application 22. Second frame 84 contains controls for providing credentials ultimately presented to authorization service 16. Third frame 86 contains controls for selecting and managing electronic documents managed by resource 28. The content for first and second frames 82 and 84 may be provided to and displayed by browser 41 after requesting access to application service 12 in step 64. The content for third frame 86, while requested after browser 41 opens web page 80, is not provided until authorization service 16 returns to resource service 14 in step 74 a positive response instructing access module 32 to grant application 22 access to resource 28. The content in third frame 86 may be provided to browser 41 directly from resource service 14. Alternatively, the content may be mediated through and perhaps augment by application service 12.

First frame 82 includes controls 90-94 for printing, e-mailing, and faxing a document or documents selected in third frame 86. Using controls 90, a user can instruct application 22 to print a selected document. Using controls 92 or 94, the user can instruct application 22 to send the selected document to a particular e-mail address or fax the document to a particular number.

Second frame 84 includes controls 96-100 enabling a user to manually provide credentials. Controls 96 and 98 enable the user to enter a user name and password while control 100 allows the user to instruct client 18 to present or return the credentials to resource service 14.

Third frame 86 includes a scroll menu 102 displaying electronic documents managed by resource 28. In this example scroll menu 102 includes check boxes 104 allowing the user to select one or more of the displayed documents. Here, the document "catalog.doc" has been selected. Also included is pull down menu 106 and command buttons 108 and 110. Pull down menu 106 allows a user to select the type of files displayed in scroll menu 102. In this example "all files" is selected. A user may, however, desire to show only word processor documents or spreadsheets. Command buttons 108 and 110 allow a user to perform tasks such as deleting or renaming documents selected in scroll menu 102.

Although the flow chart of FIG. 5 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention. The screen display of FIG. 6 is exemplary only. There exist many possible layout and control configurations for interfaces that will allow a user to interact with application 22 and resource 28. FIG. 6 merely provides one such example.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. In a computer network, a method for authorizing a request by an application to access a resource on behalf of a user, comprising
providing an authorization service that is autonomous from the application and the resource, the authorization service including programming stored on a computer readable medium;
a processor executing the programming to:
cause the authorization service to receive from the resource user credentials and a request to authorize a request by the application to access the resource, the user credentials having been obtained from the user by the application;
authenticating the credentials; and
returning an authorization response to the resource with instructions to grant the application's request to access the resource if the credentials are authentic or to otherwise deny the application's request to access the resource.

2. The method of claim 1, further comprising the processor executing the programming to cause the authorization service to receive data identifying the application, and wherein returning an authorization response includes returning an authorization response that includes instructions to deny the request to access the resource if the credentials are not authentic or to grant the request to access the resource at a level determined according to the data identifying the application.

3. In a computer network having one or more processors and one or more computer readable media, a method comprising:
the one or more processors executing programming stored on one or more computer readable media to:
receive from a user a request to access a first resource, the first resource being configured to request access to a second resource;
acquire credentials for the user and data identifying the second resource;
from the first resource, request access to the second resource on behalf of the user presenting the credentials;
identify an authorization service autonomous from the first and second resources;
from the second resource, present the credentials and requesting the identified authorization service to authorize the request by the first resource to access the second resource;
authenticate the credentials; and
return an authorization response containing instructions to either grant or deny the request to access the second resource determined according to the authenticity of the credentials.

4. The method of claim 3, further comprising providing the identified authorization service with data identifying the first resource, and wherein returning an authorization response includes returning an authorization response that includes instructions to deny the request to access the second resource if the credentials are not authentic or to otherwise grant the request to access the resource at a level determined according to the data identifying the first resource.

5. In a distributed environment a method for producing an electronic document comprising:
a processor executing programming stored on a computer readable medium to:
receive a request from a document production service to access and retrieve a selected document from a document management service on behalf of a user who requested access to the document production service, the request including credentials of the user;
identify an authorization service that is autonomous from the document production and management services;
provide the credentials to the identified authorization service and requesting the identified authorization service to authorize the request from the document production service to access the document management service on behalf of the user;

receive an authorization response with instructions granting or denying the request; and provide the document production service with the selected document only if the instructions grant the request.

6. The method of claim 5, further comprising providing the identified authorization service with data identifying the document production service, and wherein receiving an authorization response includes receiving an authorization response that includes instructions to deny the request from the document production service to access the resource on behalf of the user if the credentials are not authentic or to otherwise grant the request to access the resource at a level determined according to the data identifying the document production service.

7. A computer readable medium having instructions for:

receiving a request from a user to access a first resource;

from the user, acquiring credentials and data identifying a second resource;

presenting the credentials and a request from the first resource to access to the identified second resource;

identifying an authorization service autonomous from the first and second resources;

presenting the user credentials and a request from the second resource for the identified authorization service to authorize the request from the first resource to access the second resource;

authenticating the credentials; and returning to the second resource an authorization response containing instructions to grant the request to access the second resource only if the credentials are authentic or otherwise to deny the request.

8. The medium of claim 7, having further instructions for providing the identified authorization service with data identifying the first resource, and wherein the instructions for returning an authorization response include instructions for returning an authorization response that includes directions to grant the request to access the resource at a level determined according to the data identifying the first resource only if the credentials are authentic or otherwise to deny the request.

9. A computer readable medium having instructions for:

receiving a request from a document production service to access a document management service to retrieve a selected document on behalf of a user who requested access to the document production service, the request including credentials for the user;

identifying an authorization service that is autonomous from the document production and management services;

providing the credentials to the identified authorization service and requesting the identified authorization service to authorize the request from the document production service to access the document management service on behalf of the user;

receiving an authorization response with directions to grant the request only if the credentials are authentic or otherwise to deny the request; and providing the document production service with the selected document only if the directions are to grant the request.

10. The medium of claim 9, having further instructions for providing the identified authorization service with data identifying the document production service; and wherein:

the instructions for receiving an authorization response include instructions for receiving an authorization response that includes directions to deny the request to access the document management resource if the credentials are not authentic or otherwise to grant the request to access the resource at a level determined according to the data identifying the document production service; and the instructions for providing the document production service with the selected document include instructions for providing the selected document only if the level of access granted permits.

11. In a computer network, a system for authorizing a request from a first resource to access a second resource on behalf of a user, the system comprising one or more computer readable media and one or more processors for executing programming stored on the one or more computer readable media, the programming comprising an authorization service, a resource module, and an access module, wherein:

the authorization service is autonomous from the first and second resources and is operable, when executed, to authenticate the user's credentials and to at least indirectly return an authorization response to the access module with directions to grant the first resource access to the second resource only if the credentials are authentic;

the resource module is operable, when executed, to at least indirectly provide the access module with the user's credentials and a request from the first resource to access the second resource; and the access module is operable, when executed, to acquire the credentials provided with the request from the first resource to access the second resource, to at least indirectly provide the credentials to the authorization service with a request, made on behalf of the second resource, for the authorization service to authorize the first resource to access the second resource on behalf of the user, and to grant the first resource's request to access the second resource according to an authorization response received, at least indirectly, from the authorization service.

12. The system of claim 11, wherein the access module is further operable to identify the authorization service.

13. The system of claim 11, further comprising an access database for containing an entry associating a user with the authorization service and wherein the access module is further operable to obtain data identifying the user, to open the access database, and to identify the resource service associated with the data identifying the user, and to request the identified authorization service to authorize the request to access the resource.

14. The system of claim 11, wherein the authorization service is further operable to verify an access level to be granted to the first resource and to return to the access module an authorization response with instructions granting the request according to the verified access level.

15. The system of claim 11, further comprising an authorization database to contain an entry associating data identifying the first resource with policy data specifying the access level to be granted to the first resource, and wherein the access module is further operable to provide the authorization service with data identifying the first resource, and wherein the authorization service is further operable to open the authorization database and identify policy data associated with the data identifying the first resource and to return to the access module an authorization response with instructions granting the request according to the identified policy data.

16. In a distributed environment, a system for producing an electronic document, the system comprising one or more computer readable media and one or more processors executing programming stored on the one or more computer readable media, the programming comprising a document management resource, a document production resource, an authorization service, a resource module, and access module, wherein:

the document production resource is operable, when executed, to produce a selected electronic document accessed from the document management resource on behalf of a user;

the authorization service is autonomous from the document management and document production resources and is operable, when executed, to receive a request from the access module to authorize the document product resource to access the document management service on behalf of the user, wherein the request includes the user's credentials, the authorization service is operable to authenticate the user's credentials and to return an authorization response to the access module with directions to grant access to the second resource only if the credentials are authentic;

the resource module is operable, when executed, to provide the access module with the user's credentials and a request from the document production service to access the document management service on behalf of the user; and the access module is operable, when executed, to acquire the credentials provided with the request received from the resource module, to provide the credentials to the authorization service with a request, made on behalf of the document management resource, for the authorization service to authorize the document production service to access the document management service on behalf of the user, and to grant the request from the resource module according to an authorization response received from the authorization service.

* * * * *